Dec. 22, 1953   I. I. SIKORSKY   2,663,372
VARIABLE PITCH CONTROL OF HELICOPTER COAXIAL ROTORS
Filed May 4, 1948   3 Sheets-Sheet 1

IGOR I. SIKORSKY
INVENTOR

BY  M. B. Tasker

ATTORNEY

Dec. 22, 1953     I. I. SIKORSKY     2,663,372
VARIABLE PITCH CONTROL OF HELICOPTER COAXIAL ROTORS
Filed May 4, 1948     3 Sheets-Sheet 2
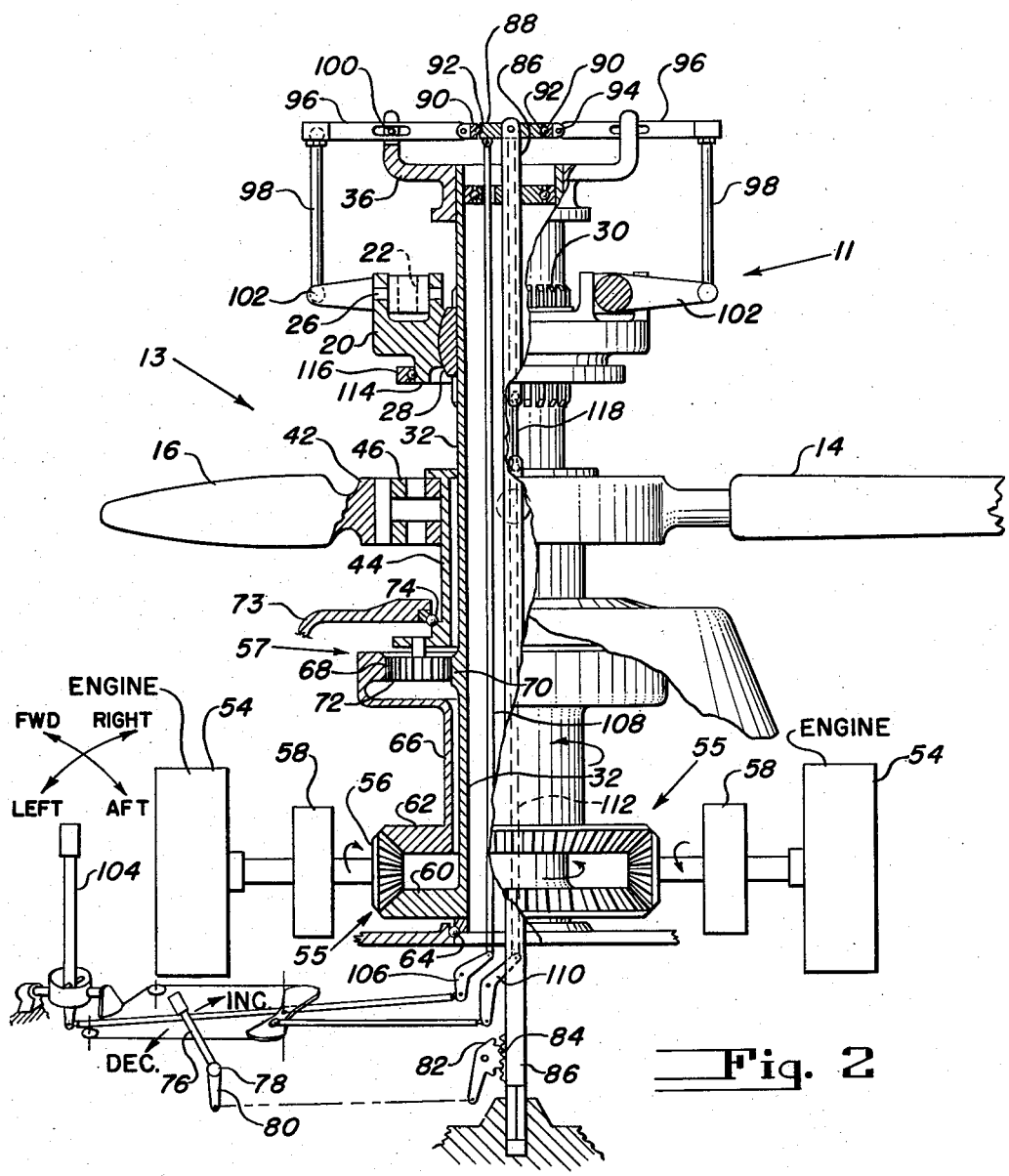
IGOR I. SIKORSKY
INVENTOR
BY M. B. Tasker
ATTORNEY

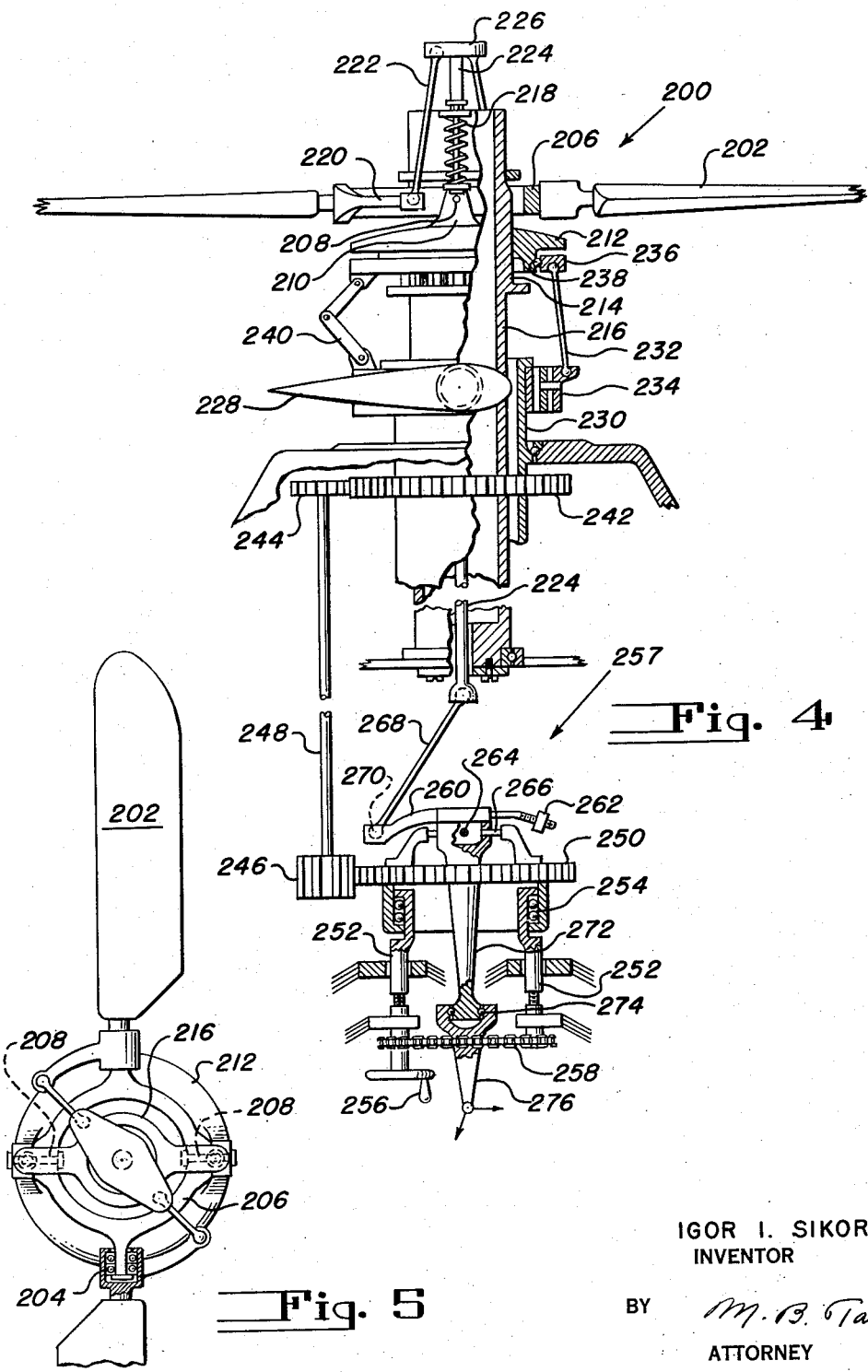

Patented Dec. 22, 1953

2,663,372

UNITED STATES PATENT OFFICE 2,663,372

VARIABLE PITCH CONTROL OF HELICOPTER COAXIAL ROTORS

Igor I. Sikorsky, Bridgeport, Conn., assignor to United Aircraft Corporation, East Hartford, Conn., a corporation of Delaware Application May 4, 1948, Serial No. 24,949

7 Claims. (Cl. 170—135.26)

This invention relates to helicopters and particularly to novel means for utilizing the pitch setting of one of two coaxial rotors to determine and control the pitch of the other rotor.

Accordingly, an object of this invention is to provide a helicopter having two coaxial sustaining rotors wherein manual means control the total and cyclic pitch of the blades on one rotor and the aerodynamic and dynamic forces acting on the blades of that rotor control and maintain the pitch setting of the second rotor.

A further object is to provide means for applying pitch setting to a main sustaining rotor in accordance with the pitch impressed on a pilot rotor.

A further object is to provide means for controlling the pitch of a rotor having a single large blade by applying a relatively small control force to a pilot rotor and utilizing the aerodynamic and dynamic forces in the pilot rotor to control the pitch of the large blade.

Other and further objects and advantages will be apparent from the specification and claims, and from the accompanying drawings which illustrate two embodiments of my invention.

In the drawings,

Fig. 2 is a diagrammatic view, partly in section, taken on line 2—2 of Fig. 1 with parts of the rotor head broken away to show the pitch controls and the drive for the coaxial rotors;

Fig. 4 is a partly sectioned diagrammatic view of a modified structure; and

Fig. 5 is a plan view, partly in section, of Fig. 4 with one blade broken away to facilitate illustration.

It has been considered desirable to utilize but one blade in the sustaining rotor of a helicopter. A single bladed rotor would reduce the number of parts and simplify the control system over that required in helicopters employing a plurality of rotor blades but the control forces required to effect pitch variations in a large blade would be great and to apply such forces directly would require some form of boost system. It is the purpose of my invention to apply control forces with a simple control system to a small pilot rotor and to utilize the aerodynamic and dynamic forces in the small rotor to control the large rotor. My system will eliminate any direct force application to the main rotor and will retain the so-called "feel" in the controls.

Figure 1:
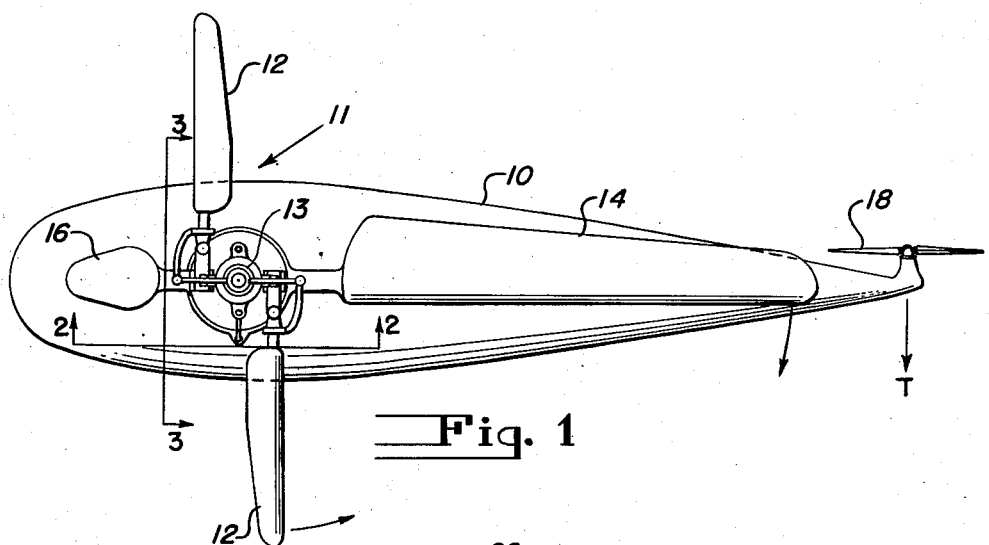
Fig. 1 shows a top plan view of a helicopter constructed in accordance with this invention.

Referring to Fig. 1, a helicopter body 10 is sustained and propelled by a small pilot rotor 11 having blades 12 mounted thereon and by a main rotor 13 utilizing a large single blade 14 counterbalanced by weight 16. The rotors rotate in opposite directions but, due to the inequality of the power absorbed in the two rotors, there is a residual torque component, tending to turn the body 10 of the helicopter, which is compensated by a tail rotor 18 exerting a thrust T in the direction indicated.

Figure 3:
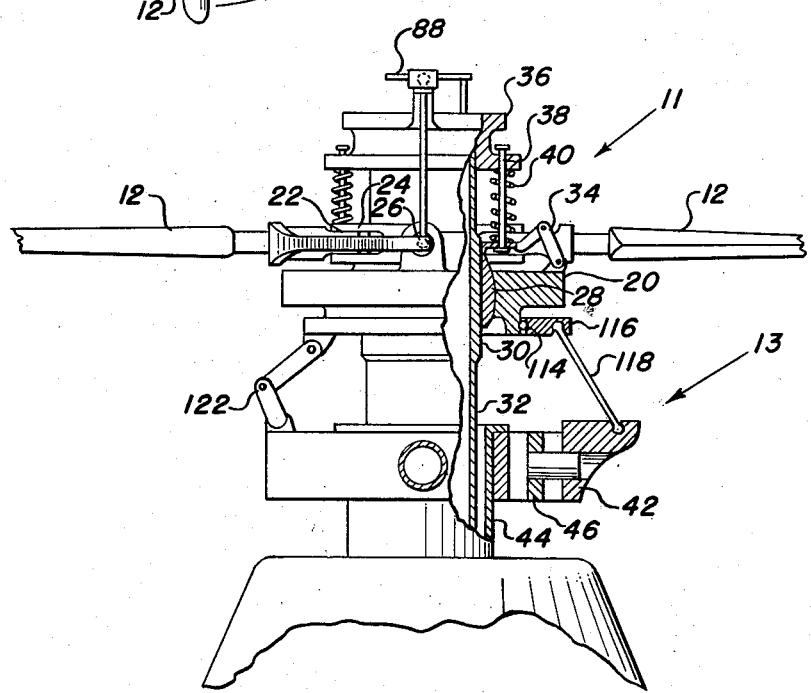
Fig. 3 is a view taken on line 3—3 of Fig. 1 with parts of the rotor head broken away.

As shown in Figs. 2 and 3, the blades 12 of the small rotor are connected to an annular support 20 through the conventional drag hinge 22, flapping links 24, and offset flapping hinges 26. The support 20 is driven by a hollow drive shaft 32 through a plurality of scissors 34 and is mounted for tilting movement in any direction on arcuate bearing 28 which is axially slidable on and driven by splines 30 on the drive shaft 32. A control support member 36 is welded or otherwise connected to the shaft 32 on the upper end thereof. Guide pins 38, serving to position compression springs 40 which bias the bearing 28 and the support 20 to the lowermost position, are slidably positioned in cooperating holes in the member 36 and a flange on the bearing 28.

A pair of engines 54 drive the shaft 32 through overrunning clutches 58 and bevel gears 56, 60. The bevel gear 60 is mounted on the lower portion of the shaft 32 and supported by a thrust bearing 64. It should be noted that the number of engines 54 may be increased or reduced depending on the power requirements of the particular helicopter. Bevel gears may conveniently be utilized to drive the tail rotor 18 and/or various accessory components such as a tachometer generator, hydraulic pumps, etc.

The large blade 14 and the counterweight 16 are rigidly mounted on a ring 42 which is connected through an intermediate ring 46 by means of a gimbal universal to shaft 44 which is coaxial with the shaft 32 and is driven by the engines 54 throught an intermediate shaft 66. Bevel gears 56, driven by the engines 54 through clutches 58, engage a bevel gear 62 which is integral with shaft 66. A sun gear 70 is mounted on the shaft 32 in the same plane as ring gear 68 which is on the upper portion of shaft 66. Shaft 66 and the inner shaft 32 are driven at the same speed but in opposite directions. A plurality of planet gears 72, engaging ring gear 68 and sun gear 70, drive the shaft 44, which is positioned by bearings 74, at a fraction of the speed of the inner shaft 32 and in the opposite direction with respect thereto. By way of example a speed ratio of 3:1 is shown for shafts 44 and 32, but this ratio will vary with the design of the helicopter.

Positive pitch control, both cyclic and total, is imposed only on the small rotor 11. As shown in Fig. 2, the total pitch of the blades 12 is controlled manually through the control stick 76 which is pivoted at 78 and rod 86 lying inside the coaxial rotor drive shafts 32, 44. As the stick 76 is pulled up to increase the pitch, the depending arm 80 rigid therewith will be moved to the left to rotate the pinion gear 82, which engages a rack 84, to move the total pitch rod 86 and spider 88, universally mounted in rod 86, downwardly. The spider 88 is connected, by bearings 92, to a rotating ring 90, which, in turn, is connected by pivots 94 to the inner end of floating links 96. Each link 96 is connected at approximately its midpoint to support member 36 in a pin and slot pivot 100 and is connected at its outer end to the control rod 98 by means of a ball pivot. The lower end of control rod 98 is connected to control horn 102 which gives the control the usual 90° lead and is integral with the outer stub shaft on which the blade 12 is mounted. The outer stub shaft is mounted on needle bearings and is coaxial with an inner shaft which is pivotally mounted on the drag hinge 22 at its inner end. The details of such construction form no part of this invention but may be seen in my copending U. S. application, Serial No. 592,862, issued August 1, 1950, as Patent No. 2,517,509.

Downward movement of the plate or spider 88 will move the ring 90 and pivot 94 on floating link 96 downwardly to rotate the link about pin 100 and raise the outer end of the link 96 and control horn 102 to increase the pitch of the blade. Forward and downward movement of the control stick 76 would act through the rod 86 to raise the spider 88, lower rod 98, and decrease the pitch of the blade.

Cyclic variations in the pitch setting of the blades 12 on the small rotor are obtained by moving the control stick 104. Forward movement of the control stick 104 will rotate the bell crank 106 counterclockwise to push the control rod 108 up and tilt the spider 88 (downwardly at the right as viewed in Fig. 2). Such tilt on the spider 88 will lower the control horn 102 at the left of Fig. 2 and raise the control horn 102 at the right of Fig. 2. Of course, as the blades rotate, the pitch will be varied cyclically in accordance with the degree of tilt of the spider 88. Lateral control is obtained by moving the stick 104 to rotate the bell crank 110 and move the control rod 112 up or down to tilt the spider 88 to the left or right and cyclically vary the pitch of the blades 12. It should be noted that when plate 88 is tilted to the right, the motion of the craft will be to the left. Also, when the plate is tilted aft, the craft will be in forward flight.

The pivot points of bell cranks 106 and 110 should be mounted for movement with the total pitch rod 86 to prevent cyclic pitch variations when the total pitch stick 76 is moved.

As the pitch of the blades 12 is increased, the lift of the blades will be increased. This lift will be transmitted through the drag and flapping hinges to the rotating annular support 20 and bearing surface 28 which will move upwardly on the splines 30 against the compression springs 40 until a balanced condition is reached. To insure easy movement ball races may be utilized in co-operation with the splines 30. Upward movement of the rotating plate 20 and the bearing 28 will be transmitted to a control point 90° in advance of the large blade 14 on the main rotor in a manner now to be described.

As pointed out above, the ring 42 on which the large blade 14 and counterweight 16 are mounted is driven by the shaft 44 at a speed one-third that of the speed of rotation of support 20 which is driven by the inner shaft 32. On the lower portion of the support 20 is a ball race connection 114 to an annular plate 116. The ball race will allow relative rotation but will maintain the plate 20 and the annulus 116 parallel. On the periphery of the annulus 116 is a connection to one end of pitch rod 118 which connects at its other end to the ring 42 at a point 90° in advance of the blade 14. Torque scissors 122 connect ring 116 to the pitch ring 42 to carry the slight torque load due to friction.

Thus, as the total pitch of the blades 12 is increased, the increased lift of the blades will cause support 20 to rise, or fly up, against the resisting force of compression springs 40 until equilibrium is reached. The lift of the small rotor is transmitted to the shaft 32 in this way and therefore is not expended. The upward motion of the plate 20 will move pitch rod 118 to raise the ring 42 at a point 90° in advance of the single blade 14 to increase the pitch thereof. Thus it will be seen that the aerodynamic action of the blades 12 is transmitted to and applies the control force on the large blade 14 to increase the pitch thereof. By proper choice of the various control distances, the distance between flapping center and rotor shaft center and spring rates, the pitch changes in the large blade 14 may be made proportional to those impressed on the small blades.

Cyclic variations in the pitch of the blades 12 will cause the tip path plane of the small rotor to be tilted in a given direction. In this condition, the lift and centrifugal forces acting on the blades 12 will tilt the rotating plate 20 the same direction and degree as the tip path plane. There will be a time lag in this action which depends on the distance the flapping hinge is offset from the center of rotation. In the structure shown, the time lag is negligible, resulting in an almost rigid effect. It is obvious that the tilt of plate 20 will be transmitted to ring 42 and blade 14 through the pitch control rod 118 to cyclically vary the pitch of blade 14. The cyclic variations thus applied will be substantially of the same magnitude as the variations applied to the small rotor.

In the modification shown in Figs. 4 and 5 the controls vary only the total pitch setting of the pilot rotor 200. The total pitch is maintained constant for a constant total pitch setting on the main rotor. However, to impose a cyclic pitch variation on the main rotor, the total pitch of the small pilot rotor 200 is varied in synchronism with main rotor speed as will appear hereinafter.

The blades 202 on the small rotor 200 are mounted for pitch changing movements on bearings 204 on ring 206 which is pivoted on see-saw or flapping hinges 208, disposed at 90° with respect to the pitch changing axis of the blades 202, and connected to upwardly projecting lugs 210 on the plate 212 which is axially movable on, and driven by, straight splines 214 on the drive shaft 216. As in the modification of Figs. 1 through 3, the plate 212 is biased towards its lowermost position by compression springs 218. Pitch changing movements of blades 202 about the axis of bearings 204 are controlled through control horn 220, push-pull rod 222, and control rod 224 which moves plate 226 up and down in a manner to be fully described hereinafter.

The main rotor blade 228 is mounted on ring 234 which is driven through a universal connection by drive shaft 230 in the same manner as the main blade 14 in the modification shown in Figs. 1 through 3. Push-pull link 232, 90° in advance of blade 228, connects the outer ring 234, on which blade 228 is mounted, to ring 236 which is mounted on the periphery of plate 212 by means of bearings 238. Torque scissors 240 connect ring 236 to ring 234 so that both rings rotate at main rotor speed and pitch control forces through rod 232 will be in the proper phase relationship with the blade 228.

The drive mechanism for shafts 230 and 216 has not been shown but may be of the type illustrated in Fig. 2 or may be any other type which will provide a higher rotative speed for the shaft 216 than shaft 230 to give blades 202 the required velocity.

Mounted on shaft 230 is gear 242 which drives pinion gear 244. Pinion gear 244 drives another pinion gear 246 through shaft 248. Pinion gear 246 drives gear 250 at the same speed as the main rotor blade 220 through wide gear faces so that the driving connection is maintained when gear 250 is moved vertically by stationary jack screws 252, the shafts of which are mounted in bearings which are rigid with the aircraft frame, on which the gear is mounted by means of a plurality of two-way thrust bearings 254. Hand wheel 256 and chain 258 are used to impart simultaneous rotational movement to the bottom members of jack screws 252 to obtain vertical movement to the upper sections of the jack screws and to the gear 250. Mounted on top of the gear 250 and rotatable therewith is a control mechanism 257 having a radially disposed arm 260, counterbalanced by an adjustable weight 262, universally mounted by means of pins 264, 266. The outermost end of arm 260 is connected by a swivel joint 270 to the control rod 224 through push-pull link 268. Although in this modification push-pull link 268 is shown in an inclined position, it is possible also to have this rod perpendicular by attaching a bracket rigidly to push-pull rod 224. Therefore, as the hand wheel 256 is turned in the proper direction, the jack screws 252 will elevate the gear 250, the point of connection 270 and push-pull link 268 to rotate in a higher plane. This will lift control rod 224 and increase the pitch of the blades 202. As the pitch of the blades 202 is increased, they will fly up against the force of compression springs 218 to lift plate 212, ring 236, and push-pull rod 232 to increase the pitch of the main blade 228 a corresponding amount.

Depending from the universal mounting of arm 260 is a member 272 which is connected through bearings 274 to a stationary cyclic pitch lever 276. When no cyclic pitch is to be imposed on the main rotor blade 228, the member 272 and lever 276 are aligned with the center of rotation of the gear 250. When lever 276 is moved out of alignment, it will cause the arm 260 to rotate in an inclined plane, inclining the path of point 270.

Since the mechanism 257 rotates at main rotor speed, the lift of blades 202 will reach a maximum and a minimum during each revolution of the main rotor, resulting in the pilot rotor 200 flying up and down on splines 214 in synchronism with main rotor speed. As rotor 200 reaches its uppermost position, the pitch of blade 228 will be at its maximum and, conversely, the pitch is at a minimum when rotor 200 is at its lowermost position. It will be evident, therefore, that by changing the total pitch of rotor 200 in synchronism with main rotor speed the pitch of blade 228 will be varied cyclically to obtain directional control.

It should be understood that the control systems I have shown may be utilized on helicopters employing other arrangements of rotor blades. For example, a plurality of blades may be employed in place of the large single blade or the rotors may be of equal size. Therefore, I do not wish to be limited to the specific embodiments herein illustrated and described.

I claim:

1. In a helicopter, a main sustaining rotor having a single, large radius variable pitch blade, an auxiliary rotor having a plurality of smaller radius variable pitch blades, means including an engine for driving said main and auxiliary rotors at different speeds and in opposite directions relative to each other, pilot controlled means including connections to said auxiliary rotor blades for changing the collective pitch of the latter, and means connecting said auxiliary rotor to said main rotor and responsive to aerodynamic and dynamic forces acting on said auxiliary rotor as a result of a collective pitch change imposed thereon by the pilot for controlling the pitch of said main rotor blade.

2. In a helicopter, a main sustaining rotor having a variable pitch blade, an auxiliary sustaining rotor having a blade rotatable relative to said main rotor, an engine, means including separate drive shafts for driving said main and auxiliary rotors in opposite directions from said engine, pilot controlled means including connections to said auxiliary rotor blade for changing the pitch of the latter, means for supporting said auxiliary rotor for axial movement along its drive shaft in response to variations in lift of said auxiliary rotor, resilient means opposing movement of said auxiliary rotor due to increased lift, and operative connections between said main and auxiliary rotors for controlling the pitch of said main rotor blade in response to movements of said auxiliary rotor as a result of a change of pitch imposed on said auxiliary rotor blade by the pilot.

3. In a helicopter, a main sustaining rotor having at least one variable pitch blade of large radius, said blade being of such dimension that the forces required to change the pitch thereof are too great to be overcome directly by the pilot, an auxiliary rotor having a plurality of variable pitch blades of smaller radius than said main rotor blade, an engine, and drive means between said engine and said main and auxiliary rotors for driving the latter in opposite directions and at different speeds, pilot controlled means including connections to said auxiliary rotor blades for changing the collective pitch of the latter, and means connecting said auxiliary rotor to said main rotor responsive to aerodynamic and dynamic forces acting on said auxiliary rotor as a result of a collective pitch change imposed thereon by the pilot for correspondingly changing the pitch of said main rotor blade.

4. A helicopter having an engine, rotor drive shafting, coaxial variable pitch main and auxiliary rotor blades, each having a hub universally inclinable relative to the axis of said shafting, said auxiliary rotor hub having an axial splined connection with said shafting, pilot operative means having operative connections to said auxiliary blades eccentrically of their pitch changing axes for controlling the pitch of said auxiliary blades both cyclically to cause the hub of said auxiliary rotor to incline as a result of aerodynamic forces acting on said blade and collectively to cause said auxiliary hub to move axially as a result of said aerodynamic forces, and means for effecting a corresponding pitch change of said main blade as a result of the inclination and axial movement of said auxiliary blade hub including a connection from said auxiliary blade hub to the hub of said main blade.

5. A helicopter having an engine, rotor drive shafting, coaxial variable pitch main and auxiliary rotor blades each having a hub universally inclinable relative to the axis of said shafting, the blades of said auxiliary rotor having blade pitch changing horns terminating eccentrically of the blade axis and the hub of said auxiliary rotor blades having an axial splined connection with said shafting, pilot operative means having operative connections to said auxiliary blade horns for controlling the pitch of said auxiliary blades either cyclically to cause said auxiliary blade hub to incline or collectively to cause said hub to move axially as a result of aerodynamic forces acting on said auxiliary blades, and means for effecting a corresponding cyclic or collective pitch change of said main rotor blade as a result of the movement of said auxiliary blade hub including a connection from said auxiliary blade hub to the hub of said main blade.

6. In a helicopter, two coaxial drive shafts, a main rotor including a hub mounted for universal tilting movement on one of said shafts, at least one variable pitch blade mounted on said hub, an auxiliary rotor including a hub mounted for pivotal movement on the other of said shafts, a plurality of variable pitch blades mounted on said auxiliary rotor hub, each of said auxiliary rotor blades having a pitch changing horn extending laterally from the pitch changing axis thereof, means for changing the pitch of said main rotor blade cyclically comprising a manually operable tiltable member driven by said one shaft in synchronism with said main rotor hub and connected with said pitch changing horns of said auxiliary rotor blades for varying the collective pitch of said auxiliary rotor blades in synchronism with the rotation of said main rotor blade to vary the lift of said auxiliary blades and move said auxiliary hub axially of its shaft, and an operative connection between said main and auxiliary hubs for effecting cyclic pitch changes in said main blade as said auxiliary rotor slides axially on its shaft.

7. In a helicopter, coaxial drive shafts, a main lifting rotor driven by one of said drive shafts having at least one blade, means for varying the pitch of said blade, an auxiliary rotor driven by the other of said drive shafts having a hub coaxial with said main rotor, means mounting said hub for axial sliding movement on said auxiliary rotor drive shaft, said auxiliary rotor having a plurality of blades mounted on said hub, means for varying the pitch of said auxiliary blades, drive means for said rotors including means for driving said auxiliary rotor at a speed which is a multiple of the speed of said main rotor, pilot operative means for varying the collective pitch of said auxiliary rotor blades during each rotation of said main rotor, and means responsive to aerodynamic forces acting on said auxiliary rotor blades including a connection between said hub and the pitch varying means of said main rotor blade for varying the pitch of the latter cyclically as said hub slides axially.

IGOR I. SIKORSKY.

References Cited in the file of this patent

UNITED STATES PATENTS

| Number | Name | Date |
|---|---|---|
| 1,800,470 | Oehmichen | Apr. 14, 1931 |
| 1,828,783 | Oehmichen | Apr. 27, 1931 |
| 2,041,787 | Stalker | May 26, 1936 |
| 2,041,796 | Stalker | May 26, 1936 |
| 2,271,473 | Bennett | Jan. 27, 1942 |
| 2,297,815 | Tidd | Oct. 6, 1942 |
| 2,481,745 | Hiller | Sept. 13, 1949 |
| 2,481,750 | Hiller et al. | Sept. 13, 1949 |